(No Model.)

A. BOLLINGER.
STEAM ENGINE.

No. 304,493. Patented Sept. 2, 1884.

WITNESSES:
Otto Berger
C. Sedgwick

INVENTOR:
A. Bollinger
BY Munn & Co
ATTORNEYS.

UNITED STATES PATENT OFFICE.

ANTHONY BOLLINGER, OF ZANESVILLE, OHIO.

STEAM-ENGINE.

SPECIFICATION forming part of Letters Patent No. 304,493, dated September 2, 1884.

Application filed February 1, 1884. (No model.)

*To all whom it may concern:*

Be it known that I, ANTHONY BOLLINGER, of Zanesville, in the county of Muskingum and State of Ohio, have invented a new and Improved Steam-Engine, of which the following is a full, clear, and exact description.

The object of my invention is to provide a simple, inexpensive, and durable engine, which may readily be reversed in motion, is economical in the use of steam, and requires but little attention.

The invention consists in particular constructions of the piston, with separate steam and exhaust chambers, which communicate with the steam inlet and exhaust pipes, which pipes or tubes are arranged to move with the piston and telescope the steam-supply pipe; also, in the special arrangements of the valves of the piston, and means for tripping them to reverse the piston's travel at the ends of the forward and back strokes of the piston, and in a contrivance for tripping the valves by inlet of steam at either face of the piston, to reverse the motion of the engine at will, and at any part of its stroke.

Reference is to be had to the accompanying drawings, forming a part of this specification, in which similar letters of reference indicate corresponding parts in all the figures.

Figure 1:
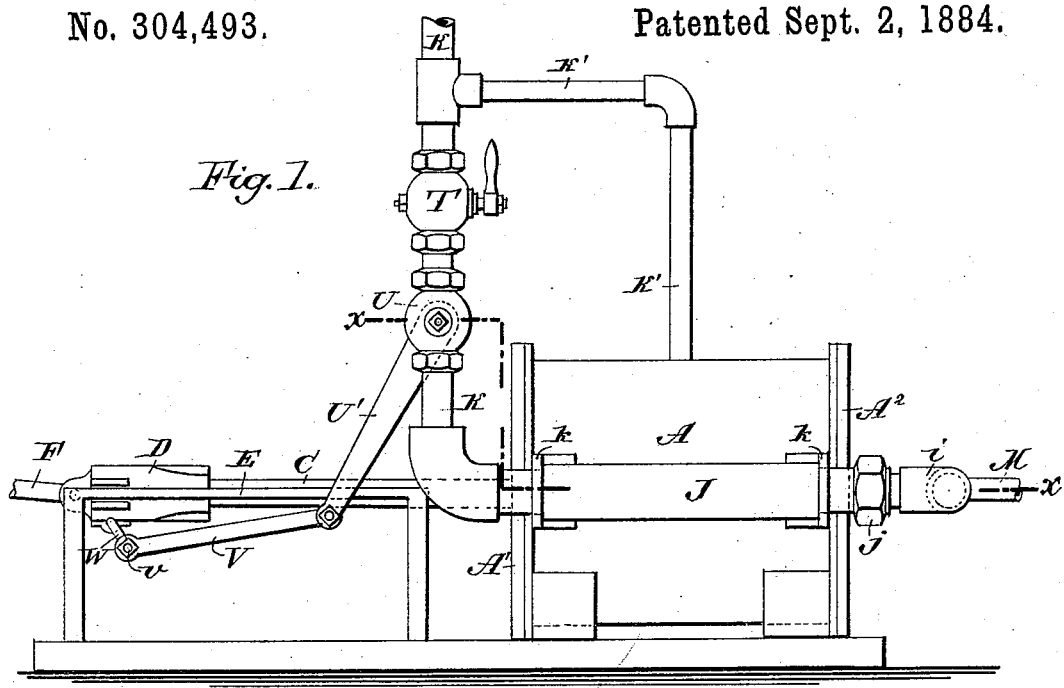
Figure 2:
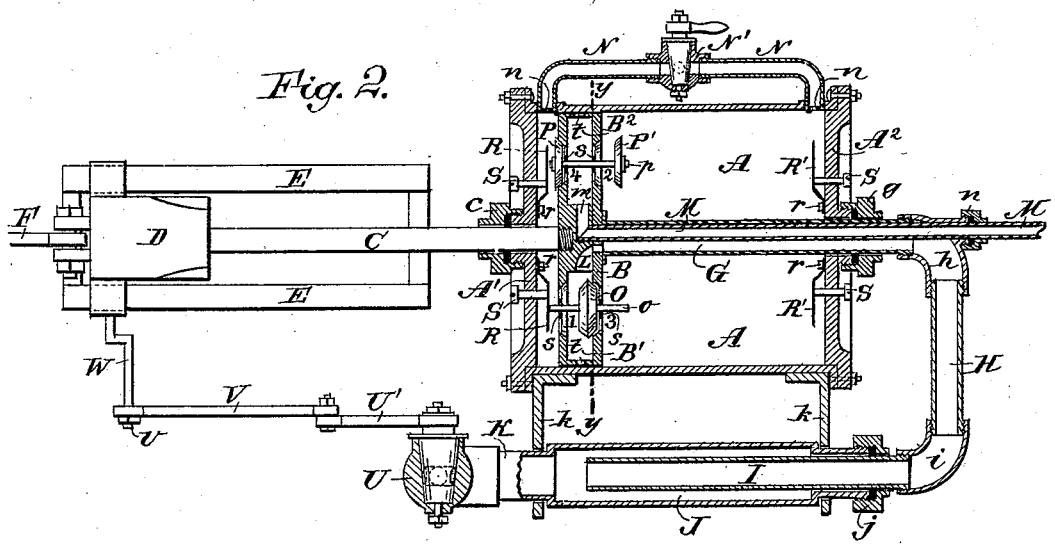
Figure 3:
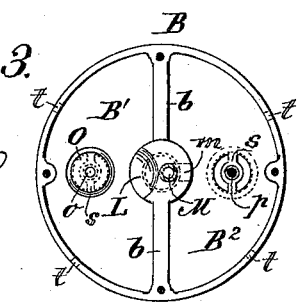

Figure 1 is a side elevation of my improved steam-engine. Fig. 2 is a plan view of the same, with parts in horizontal section on line $x\, x$, Fig. 1; and Fig. 3 is a sectional elevation through the piston on the line $y\, y$, Fig. 2.

A is the cylinder, B the piston, C the piston-rod, D the cross-head, E the cross-head guides, and F the connecting-rod, of a steam-engine embodying my improvements.

The piston B has a central partition, $b$, dividing its interior into two chambers, $B'\, B^2$, which are respectively the steam and exhaust chambers of the piston. The piston-rod C is secured to the piston at one side and moves through a stuffing-box, $c$, in one cylinder-head, and a tube or pipe, G, is fixed to the opposite side of the piston and passes through a stuffing-box, $g$, in the other cylinder-head. The tube G connects by an elbow-coupling, $h$, a cross-pipe, H, and a second elbow-coupling, $i$, with a tube or pipe, I, arranged parallel with the tube G, and working through a stuffing-box, $j$, in the end of a steam-supply pipe, J, which connects with the main steam-pipe K, said pipe J being held firmly in brackets $k$, fixed to the cylinder A, as shown, or to the engine-base. The tubes I H G being thus connected together and to the piston B, all these four parts move together on the forward and back strokes of the engine, and the steam from pipes K J passes, through tubes I H G and a passage, L, in partition $b$, into the steam-chamber $B'$ of the piston, the exhaust-steam passing from the exhaust-chamber $B^2$ of the piston through a passage, $m$, and a tube, M, held, preferably, within the tube G, and passed out through a stuffing-box, $n$, of coupling $h$, whence the exhaust-tube M may project to work back and forth by a telescopic joint with any suitably-arranged stationary exhaust-pipe, for final escape of the exhaust-steam from the engine. The steam-chamber $B'$ of piston B is fitted with a double-faced valve, O, on a stem, $o$, which valves O are seated alternately on the opposing interior faces of the side or face plates of the piston, and the exhaust-chamber $B^2$ is fitted with valves P P' on opposite ends of a valve-stem, $p$, and arranged to be seated alternately on the exterior faces of the side plates of the piston, as will be understood from Fig. 2. The valve-stems are guided in suitable apertured cross-bars, $s$, which span all four of the steam and exhaust ports 1 2 3 4 of the chambered piston B.

The letters R R' indicate springs fixed at $r$ to the opposite cylinder-heads, for tripping the steam and exhaust valves at both ends of the stroke; and said springs R R' may be carried inward at their free ends more or less, for close adjustment with relation to the valve-stems, by screws or pins S, fitted in the cylinder-heads.

Steam being admitted through main valve T and cut-off valve U to the pipe J, it enters the piston-chamber B'. In the position of the parts shown in Fig. 2 the piston has just completed its outward stroke, and the valves O P P' have been tripped to the right hand by contact of their stems with the springs R, which actions have opened steam-port 1 and exhaust-port 2, which allows the steam which has driven the piston on the outward stroke just finished to exhaust through port 2, passage $m$, and pipe M, and at the same time the steam enters through port 1, between the piston B and the head A' of the cylinder, tightly closing opposite valves, O P, to their seats and driving the piston B inward to the right until the valves are again tripped by the opposite springs, R', on cylinder-head A², which action closes the steam and exhaust ports 1 2 and permits the steam used on the inward stroke to exhaust through port 4 and passage m into pipe M, and opens steam-port 3, to admit steam between the piston B and cylinder-head A², to drive the piston outward again, to complete a full stroke of the engine, these operations being repeated for continued reciprocations of the piston until the steam is shut off.

After the engine stops, it may be started again in the same direction of rotation in which it was last moving by simply turning on the steam; but it often is desirable, as in hoisting-engines, to reverse the motion of the engine at varying intervals; and to provide for such reversal I admit steam from pipe K, through a branch pipe, K', to a pipe, N, opening into both ends of the cylinder A, and controlled by any suitable three-way cock, N', or other device permitting the passage of live steam at will to either end of the cylinder, to force the valves to their seats from that side and cause the piston to travel from the side at which steam was admitted from the pipe N to the end of its stroke in either direction, the inlet of steam from pipe N being permitted for only so long as it takes to quickly shift the valves, and the steam-supply to the chamber B' and the cylinder being maintained, as before, for driving the piston. The extent of opening of the valve U is controlled by connecting the rock-arm U' of the valve-plug by a link, V, with a crank-arm, W, fixed to the cross-head D. The arm W may be held rigidly to the cross-head by a set-screw or other clamp device, so as to bring its wrist or point of pivoting with the link V at v nearer to or farther from the axis of the valve-plug, and thus vary the throw of the rock-arm U' to open the valve U more or less, as may be desired or necessary to accommodate the pressure of the steam or the work to be done. If desired, the cranks W may be permanently fixed to the cross-head, and the link V be adjusted on a slot in either the rock-arm U' or in the crank W, or in both, to vary the throw of the valve.

It is not essential that the exhaust-valves P P' be tripped to either side by contact with the springs R R', as the live-steam pressure entering the steam-ports 1 3 would itself act by its excess of pressure to trip the exhaust-valves; but the prompt tripping of the exhaust-valves by the contact of their stems at opposite ends of the cylinder is preferred in practice.

It is evident that the valve-stems may act directly against the cylinder heads or studs therein in tripping the valves instead of against the springs R R'; but the use of the springs is preferred, as they afford ready means of adjustment to accommodate the expansion and contraction of the parts, and by yielding to any overpressure of the valve-stems at the extremes of travel of the piston in either direction, the springs prevent breakage of the parts. In adjusting the springs R R' the crank is set to the opposite dead-centers, and the screw S set up to carry the springs against the stems of the closed valves.

To avoid a loss of steam by its entering the pipe N at either side of valve N' and wasting into the exhaust, I may fit downwardly-opening check-valves n in the pipe at the openings to the cylinder; or cocks may be used in place of the check-valves, if desired.

Suitable apertures, t, may be made in the edge of the piston B, to force its packing against the bore of the cylinder.

The simplicity of my invention is apparent, there being no outside steam-chest, slide-valves, or eccentrics to work the valves, and economy in the use of steam is secured, as only the steam contained in the cylinder proper is exhausted, and no loss is sustained by "clearance" or waste room in the ports from which live steam is directly exhausted.

By passing the exhaust-pipe M through the steam-pipe G a single stuffing-box, g, on the cylinder-head answers for both pipes.

All the parts of my engine are readily accessible, and the worn valves and other parts may easily be replaced by new ones; and the engine is especially adapted for hoisting purposes where quick reversals are required, and the machine as a whole may be constructed economically and be maintained in use for a long time with comparatively small outlay for repairs.

I am aware that, broadly, it is old to employ a piston provided with the live-steam and the exhaust-steam chambers, said chambers having steam-supply and exhaust valves capable of operation by contact with the cylinder-heads, and to adapt the piston-rod to serve as the steam-supply and exhaust passages.

Having thus fully described my invention, I claim as new and desire to secure by Letters Patent—

1. The combination, in an engine, of the cylinder A, having the adjustable yielding trip-plates R R', and a piston, B, having a rod, C, and piston-tube G, connecting by moving tubes H I with the steam-supply pipe, said tube or pipe I telescoping said supply-pipe, said piston B having interior steam and exhaust chambers, B' B², fitted, respectively, with the interior and exterior valves, O P P', and with the steam and exhaust passages L m, connecting, respectively, with the tube G and exhaust-pipe M, substantially as shown and described.

2. The combination, with the cylinder A and the piston B, chambered at B' B², and fitted with the valves O P P', as specified, of the adjustable yielding trip-plates R R', substantially as shown and described.

3. The combination, with the cylinder A and its piston B, having steam and exhaust chambers B' B², and valves O P P', as specified, of the pipe N, valved to admit live steam at either side of the piston, to trip the piston-valves for reversing the engine, substantially as shown and described.

4. The combination, in an engine, of the cylinder A, the piston B, having a rod, C, and a piston-tube, G, connecting by moving tubes H I with the steam-supply pipe, said piston B having interior steam and exhaust chambers, B' B², fitted, respectively, with the interior and exterior valves, O P P', and with the steam and exhaust passages L m, connecting, respectively, with the tube G and exhaust-pipe M, and the pipe N, valved to admit steam at either side of the piston to trip the piston-valves, substantially as set forth.

5. The combination, in an engine, of the cylinder A, having the adjustable yielding trip-plates R R', the piston B, having a rod, C, and a piston-tube, G, connecting by moving tubes H I with the steam-supply pipe, said piston B having interior steam and exhaust chambers, B' B², fitted, respectively, with the interior and exterior valves, O P P', and with the steam and exhaust passages L m, connecting, respectively, with the tube G and exhaust-pipe M, and the pipe N, valved to admit live steam at either side of the piston to trip the piston-valves, substantially as set forth.

ANTHONY BOLLINGER.

Witnesses:
MAY GEIGER,
JNO. HOOPES.